United States Patent
Reudink et al.

[11] Patent Number: 5,889,494
[45] Date of Patent: Mar. 30, 1999

[54] ANTENNA DEPLOYMENT SECTOR CELL SHAPING SYSTEM AND METHOD

[75] Inventors: Mark Reudink; Douglas O. Reudink, both of Bellevue, Wash.

[73] Assignee: Metawave Communications Corporation, Redmond, Wash.

[21] Appl. No.: 786,725

[22] Filed: Jan. 27, 1997

[51] Int. Cl.$^6$ .................................................. H01Q 3/22
[52] U.S. Cl. .......................... 342/373; 455/443; 455/444; 370/334
[58] Field of Search .................................. 342/372, 373, 342/374; 455/438, 443, 444, 277.1, 277.2; 370/334

[56] References Cited

U.S. PATENT DOCUMENTS

| | | | |
|---|---|---|---|
| 5,485,631 | 1/1996 | Bruckert | 455/33.3 |
| 5,565,873 | 10/1996 | Dean | 342/372 |
| 5,596,333 | 1/1997 | Bruckert | 342/457 |
| 5,666,123 | 9/1997 | Chrystie | 342/373 |
| 5,684,491 | 11/1997 | Newman et al. | 342/374 |

*Primary Examiner*—Mark Hellner
*Attorney, Agent, or Firm*—Fulbright & Jaworski L.L.P.

[57] ABSTRACT

A system and method are disclosed for dynamically sizing sectors of a multi-sectored radiation pattern. The disclosed invention teaches the use of multiple narrow beams composited to form a radiation pattern. Signals associated with each such narrow beam may be provided to inputs of a scan receiver or signaling radio which inputs are associated with a particular sector of the radiation pattern. The number of narrow beam signals provided inputs associated with a particular sector defines the azimuthal width of that sector. By altering the number of narrow beam signals provided each such input, the azimuthal width of the sectors may be adjusted. The disclosed invention also teaches the use of attenuators in the signal path between the narrow beams and the scan receiver or signalling radio. By adjusting these attenuators, the effective length of the sectors may be adjusted.

48 Claims, 5 Drawing Sheets

ANTENNA DEPLOYMENT SECTOR CELL SHAPING SYSTEM AND METHOD

RELATED APPLICATIONS

Reference is hereby made to the following co-pending and commonly assigned U.S. patent applications: APPARATUS, SYSTEMS AND METHODS FOR MULTIPLE ANTENNA TRANSMISSION IN WIRELESS COMMUNICATIONS SYSTEMS, Ser. No. 08/520,316; METHOD AND APPARATUS FOR IMPROVED CONTROL OVER CELLULAR SYSTEMS, Ser. No. 08/582,525; and SYSTEM AND METHOD FOR CELLULAR BEAM SPECTRUM MANAGEMENT, Ser. No. 08/651,981; the disclosures of which applications are incorporated herein by reference.

TECHNICAL FIELD OF THE INVENTION

This invention relates to cellular antennas and more particularly to a system and method for providing flexible sector shaping within a multiple sector cell, including both the ability to adjust the sector's length, as referenced in the direction of propagation of the radiation, as well as its width, as referenced azimuthally.

BACKGROUND OF THE INVENTION

As cellular communications become more widely used, the number of individual users and calls multiplies. Increase in cellular communications utilization magnifies the opportunity for interference between the different users on the cellular system. Such interference is inevitable because of the large number of users and the finite number of cellular communications cells (cells) and frequency bands (channels) available.

As originally implemented, cellular communications systems were broken down into omni-trunks where each cell was able to use each channel in a 360° radius. Because of overlap in the area serviced by cells, a caller utilizing one cell in the penumbra between two cells could interfere with a caller utilizing the other cell if both were on the same channel. To avoid this interference the channel utilized by a caller in one cell would have to be disabled for any other callers in any adjacent cells. Disabling such a channel on all adjacent cells would cause many more cells than actually utilized to have the caller's channel unavailable for use by other callers. Such disabling of channels to avoid interference was recognized to lead to under-utilization of cell resources as well as depletion of available channels.

In order to avoid such under-utilization, reuse patterns were adopted in the art wherein different channel sets are assigned to different cells so that callers in adjacent cells tend not to utilize the same channel concurrently. Problems with such reuse patterns, however, include difficulty in creating a cell reuse pattern utilizing channels in such a way as not to have any two cells' use of a channel overlap, as well as limitations on the number of channels available for use in implementing such a reuse pattern.

To reduce the interference problems caused by other users in the omni cell 360° configuration, cells have also been broken down into 120° sectors such that each channel available at the cell only communicates in an area of 120° radial coverage about the cell. An advantage, in addition to the reduction of interference realized by the sector system, is that such a cell achieves extended range as compared to an omni cell 360° system simply due to the ability to focus a greater signal gain on the antennas. Individual cells may then cover a larger area, and communications signals may be stronger within the cell.

A problem with going from the omni cell 360° configuration to the sector system, however, is that as a result of splitting of the cell into 120° sectors only a third of the channels are available in each sector. This results in a reduced call capacity in any particular cell sector at a cell as compared to that available in the omni cell 360° configuration. This is because if all of the channels in a particular sector are currently being utilized by users, a channel available in another sector in that same cell may not be available for utilization by a new caller located in the loaded sector. For example, if an omni cell has 60 channels and a sector system is divided into three 120° sectors, each sector only has 20 channels. If in sector 1 there are 20 channels being used and a twenty-first user attempts to gain access, this user will not have access to the cell because of a lack of available channels in the sector. Whereas, in the omni cell 360° configuration, provided that all 60 channels are not being utilized, the twenty-first user would have had access to the cell because all channels are by definition potentially available throughout the cell.

Of course one solution might be to add to the total number of channels at the cell. However, this solution is undesirable in that the addition of channels further complicates establishing cell re-use patterns. Furthermore, as the number of channels per sector increases the possibility of interference events also increases. Likewise, the addition of channels increases the energy density within the cell and thus reduces the carrier to interference ratio which results in poorer signal quality.

It shall be appreciated that loading of sectors is often cyclic or dynamic in nature rather than constant. For example, during certain times of day, such as business commuting times, a particular sector, such as a sector encompassing an urban highway, may service more users than during other times of day. Therefore, during particular times a particular sector or sectors may require increased capacity in order to service all users whereas at other times the cell's capacity might be better utilized when spread more homogeneously throughout the cell's coverage area.

It would, therefore, be advantageous to make more efficient use of cellular capacity by being able to make sectors dynamically shapable in order to provide increased capacity to a particular area within the cell's radiation pattern by making more channels potentially available to that particular area, without actually increasing the total number of channels within the cell. Ideally, the shapable sectors will be composed of narrow beams so as to provide a convenient means by which sectors may be sized radially about the cell. Systems implementing such narrow beams are described in U.S. Pat. No. 5,563,610, entitled "NARROW BEAM ANTENNA SYSTEM WITH ANGULAR DIVERSITY," incorporated herein by reference, and the associated above-referenced co-pending and commonly assigned continuation-in-part U.S. patent application entitled "APPARATUS, SYSTEMS AND METHODS FOR MULTIPLE ANTENNA TRANSMISSION IN WIRELESS COMMUNICATIONS SYSTEMS." Management of such a system, including concurrent beam and channel management within a neighborhood of cells, is disclosed in the above referenced co-pending and commonly assigned U.S. patent application entitled "METHOD AND APPARATUS FOR IMPROVED CONTROL OVER CELLULAR SYSTEMS."

Another problem in the art is that in a cellular system, communications are typically mobile, often in vehicles travelling at considerable speed. Such mobile communication devices tend to travel through the various sectors and/or cells of a cellular system, thereby continuously effecting signal quality as fringe or shadow areas are entered and exited. These effects of signal quality are not limited to the mobile communication device itself, but also effect other communication devices operating in the area. For example, a communication device operating in one cell, although experiencing acceptable signal quality itself, may in fact be causing interference for another communication device. Such interference may be in the form of co-channel interference, near/far problems, increased energy density and the like. Therefore, it is desirable to provide a means by which such a communication device may be handed off to another sector or cell, although its communication parameters do not necessitate the hand off, in order to better serve another communication device. Likewise, such a communication device may be experiencing communication of a quality so as to be within acceptable parameters although communication of a better quality may be had through an adjacent sector or cell.

Recognizing the mobility of communications and the attendant communication quality issues, therefore, it would also be advantageous to be able to dynamically shape sectors in their longitudinal, or outboard, reach from a cell site. Preferably, as it is determined that a communication device is causing interference for another communication device or as it is determined that this communication device may itself be better served by another sector or cell, the shape of the sector currently serving the communication device may be adjusted to force a hand off of the communication device to another sector or cell. Ideally, the longitudinal shape of sectors will be accomplished through the use of attenuators in the receive signal path.

A need therefore exits in the art for a system and method for dynamically adjusting the shape of cell sectors to provide for greater trunking efficiency and the ability to serve more users. Moreover, a need in the art exists for such a system to provide azimuthal as well as longitudinal shaping of the sectors.

SUMMARY OF THE INVENTION

The present invention uses a multiple narrow beam antenna system to provide dynamically shapable sectors within a cell. By dynamically shaping the various sectors of a cell, problems of interference, such as co-channel interference or interference due to decreased carrier to noise ratio and the like, as well as channel depletion within a sector that attend the 3-sector system in wide use today may be addressed. Furthermore, through the use of dynamic sector shaping, the present invention provides the technical advantage of both increasing the number of users in a particular area which may be serviced by a cell as well as decreasing the interference to other cells.

Although any number of beams may be used in accordance with the principles of the present invention, a preferred embodiment uses 12 such beams. In order to provide 360° coverage radially about the antenna system utilizing 12 beams, each beam is adapted to provide approximately 30° azimuthal coverage.

Dynamic assignment of beams to a particular sector within the cell results in the ability to adjust the sector's width, as referenced azimuthally. For example, assigning 2 of the aforementioned 30° beams to a sector provides a sector having a 60° radiation pattern. Likewise, assigning 6 of the aforementioned 30° beams to a sector provides a sector having a 180° radiation pattern.

It will thus be appreciated that channel depletion typical to the aforementioned 3 sector system may be addressed by the use of dynamic assignment of beams. Specifically, where 20 channels were available in a 120° sector of the prior art 3 sector system, the present invention may provide 40 channels within the same 120° coverage area by assigning 2 contiguous 30° beams each to 2 sectors.

By dynamically shaping sectors, the invention may open up the re-use of certain sectors during certain times of the day as utilization demands. Therefore, it will be appreciated that a technical advantage of the present invention is to provide for greater trunking efficiency and the ability to serve more users.

The dynamic assignment of beams to cell sectors of the present invention is accomplished through the use of a switch matrix, or other means by which a signal path may be discontinued, associated with each beam. Each such means may be adjusted to provide a signal from its associated beam to any input of a base transceiver station (BTS) scan receiver or signalling radio.

Reference shall hereinafter be made to a "signaling/scan Rx." It shall be understood that such reference includes both a scan receiver or a signalling radio, either of which may be utilized according to the present invention. Moreover, as each of these devices typically need to cover the same area, it is anticipated that both such devices will be utilized according to the present invention. For example, if the scan receiver is covering 60° in its first sector, then the signaling radio also typically needs to cover 60° in its first sector. Therefore, it is expected that both devices will be utilized similarly according to the present invention.

It shall be understood that the scan receiver searches out the mobiles that are within the coverage of the associated cell and is responsible for assigning those mobiles to a specific sector as are identified by inputs at the scan receiver associated with each sector. Although utilizing both forward and reverse links, a similar function is performed by the signaling radio. Therefore, through a combination of adjusting the individual signal paths associated with the various beams and combining signals provided to a common input of the signaling/scan Rx, the shapable sectors of the present invention may be defined.

In a preferred embodiment of the present invention, attenuators are utilized to control signal amplitude as provided to inputs associated with the aforementioned signaling/scan Rx. Such attenuators may be included between the output of switch matrixes used to adjust signal paths and the inputs to the signaling/scan Rx, or may in fact replace the switch matrixes in providing the ability to discontinue the path of a particular signal to a particular input of the signaling/scan Rx.

Regardless of the existence of the aforementioned switch matrixes, the attenuators may be utilized to adjust the magnitude of a signal provided to an input of the signaling/scan Rx. Such adjusting results in the signaling/scan Rx receiving a lower power signal than is actually received by the antenna system, and thus may be used to essentially fool the signaling/scan Rx into handing off the communication to an adjacent sector or cell. Such artificially forced handing off of communications may be useful in providing capacity for another communication device in an otherwise full sector by handing off a communication device capable of communicating through an adjacent sector or cell. Similarly, the handing off may be useful in increasing signal quality by handing off a communication that, although the signal quality is within acceptable limits, is causing interference to another communication device or is itself experiencing poorer signal quality than would be available at an adjacent sector or cell.

Moreover, provision of the aforementioned attenuators results in a technical advantage in the ability to adjust the sector's effective outboard reach or length, as referenced in the direction of propagation of the radiation. It shall be appreciated that reduction of the size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers, thus a system of cells utilizing the present invention may be used to provide increased signal quality as well as increased capacity without increasing the number channels available at each cell.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention provides a system and method for dynamically shaping sectors within a cell. Preferably, the shapable sectors will be composed of narrow beams so as to provide a convenient means by which sectors may be sized azimuthally. Such multiple beams may be provided by either a single multi-beam antenna or a plurality of co-located discreet antennas.

Figure 1A:
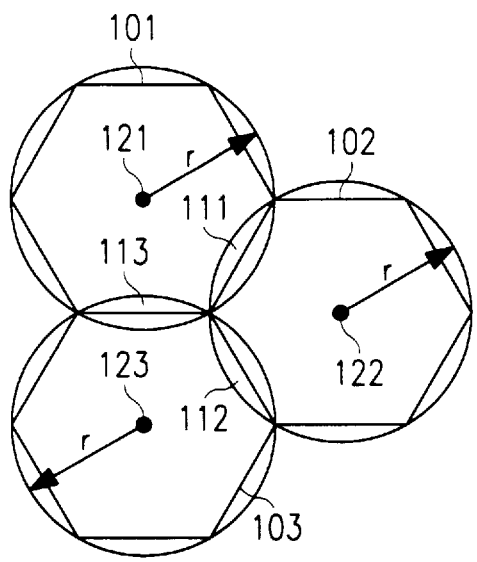
FIG. 1A illustrates a typical prior art omni-cell arrange.

To enable a better understanding of the advantages of the present invention, a brief description of some relevant prior art is included hereinafter. Directing attention to FIG. 1A, a typical prior art cellular pattern is illustrated by communications arrays 121 through 123 disposed to communicate in predefined areas, or "cells," illustrated as cells 101 through 103. These cells are omni trunk cell sites as any channel can be utilized in an entire 360° radius about the cell site.

As illustrated, a cell footprint is fixed by its forward channel radiated power, illustrated here as radius r. As can be seen by areas 111 through 113, there is some overlap between the radiation patterns of arrays 121 through 123 in order to provide the desired communication coverage within the cells.

The overlapping areas of communication coverage cause the potential for interference between communication devices operating within the cells. Therefore, to avoid interference, such as co-channel interference, when a communication device is operating on a particular channel of one cell, any adjacent cells must make that channel unavailable. It becomes readily apparent that the use of adjacent omni trunk cells providing communication on the same channels causes undesirable limitations on channel re-use and, therefore, communication capacity.

Figure 1B:
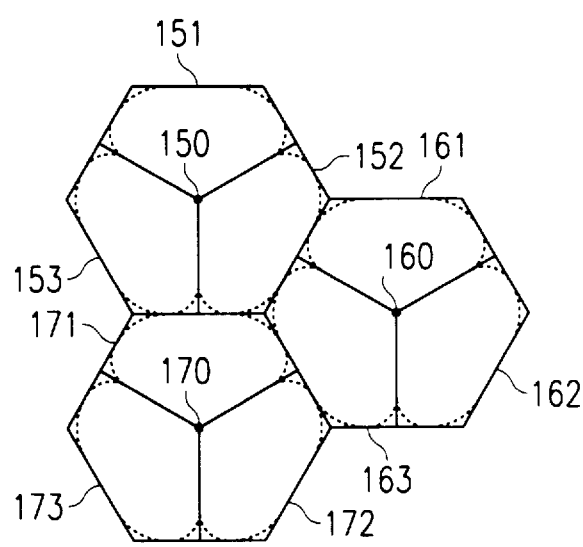
FIG. 1B illustrates a typical prior art sectored cell arrangement.

A prior art solution to this problem has been to implement a sectored cell arrangement as is illustrated in FIG. 1B. In this arrangement a single communication array provides communication in several defined sectors. For example, communications arrays 150, 160, and 170 are adapted to provide three discrete radiation patterns in predefined areas, or "sectors," illustrated as sectors 151 through 153, 161 through 163, and 171 through 173 respectively. The cells defined by this system are sector trunk cell sites wherein the available channels are divided among the sectors. Therefore, a given channel can be utilized only within one sector of the cell site. In the case of the three sectored system illustrated, channel use is limited to a 120° radius about the cell site.

Utilization of the sectored cell site provides for greater re-use of channels as adjacent cell sites may be disposed to provide sectors using the same channels which do not overlap. However, it shall be appreciated that this greater channel re-use is at the cost of reduced channel availability in any particular sector. For example, where 60 channels are used in an omni trunk cell site, 60 channels are available at any point within the cell (provided of course a channel has not been made unavailable due to its simultaneous utilization at an adjacent cell site). Whereas, if 60 channels are used in a sector trunk cell site, these channels will be divided among the sectors, and only those channels associated with a particular sector will be available at any point within that sector. Of course, it shall be understood that the above discussion ignores the possibility of a communication device being positioned such that communication within multiple sectors or cells may be satisfactorily accomplished, in order to simplify the ideas being presented.

In implementing a three sector system, typically there is a scan receiver or signaling radio coupled to the individual antenna elements providing directional coverage resulting in the sectored radiation pattern. The signaling/scan Rx searches out the communication devices that are within the coverage of that cell site and assigns those devices to a specific sector, as identified at the signaling/scan Rx by inputs associated with each sector. Generally, in a three sector system, such as illustrated in FIG. 1B, six inputs associated with the sectors are provided into the signaling/scan Rx. There are two inputs per sector because generally there are two 120° antennas per each sector.

Figure 2:
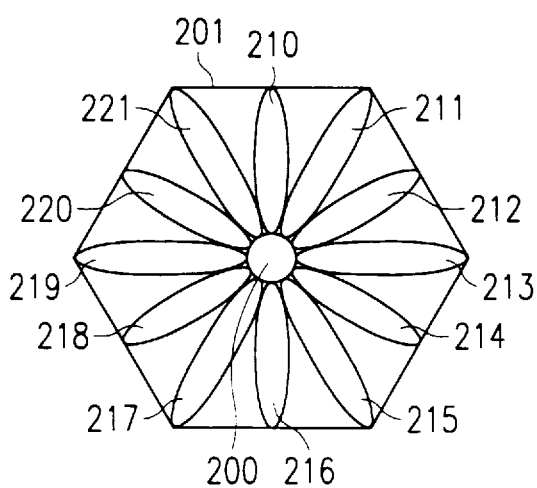
FIG. 2 illustrates a multi-beam cell utilized by the present invention.

Directing attention to FIG. 2, a multi-beam cell site utilized by the present invention is illustrated. Here 360° communication about cell site 200, and within cell 201, is accomplished by using multiple narrow beams illustrated as beams 210 through 221. Systems implementing such narrow beams are described in U.S. Pat. No. 5,563,610, entitled "NARROW BEAM ANTENNA SYSTEM WITH ANGULAR DIVERSITY," and the associated co-pending and commonly assigned continuation-in-part U.S. patent application entitled "APPARATUS, SYSTEMS AND METHODS FOR MULTIPLE ANTENNA TRANSMISSION IN WIRELESS COMMUNICATIONS SYSTEMS," both of which have been previously incorporated by reference.

It shall be appreciated that, although a preferred embodiment includes twelve narrow beams, any number of beams may be utilized according to the present invention. Of course, the number of beams, and thus their azimuthal width, utilized by the system will directly impact the minimum width of a shapable sector achievable by the present invention.

Taking for example the preferred embodiment wherein a twelve beam system is used, the azimuthal width of a single sector can be reduced to 60° where a signaling/scan Rx having two inputs per sector is used. This sector size is accomplished by feeding two substantially non-overlapping 30° beams, instead of the signal provided by two substantially overlapping 120° antennas of the prior art, into the signaling/scan Rx for this particular sector. The same azimuthal width might also be selected for a second sector, leaving the third sector having a width of 240°.

Of course, the azimuthal width of a single sector may be reduced to 30° where a single 30° beam is fed into the sector input of a signaling/scan Rx. However, the advantages of signal diversity are not realized in such a sector. Therefore, the preferred embodiment of the present invention utilizes at least two beams per sector.

It shall be appreciated that by establishing two 60° sectors, the present invention is able to provide the total number of channels available in two sectors within the same area as a single 120°. For example, where 60 channels are divided evenly among three sectors, which is a typical case of the above discussed prior art three sector system, each sector might have 20 channels associated therewith. Therefore, the 120° azimuthal width associated with the two 60° sectors of the present invention would have a total of 40 channels available therein, as opposed to the 20 channels available in the 120° sector of the prior art.

Figure 3A:
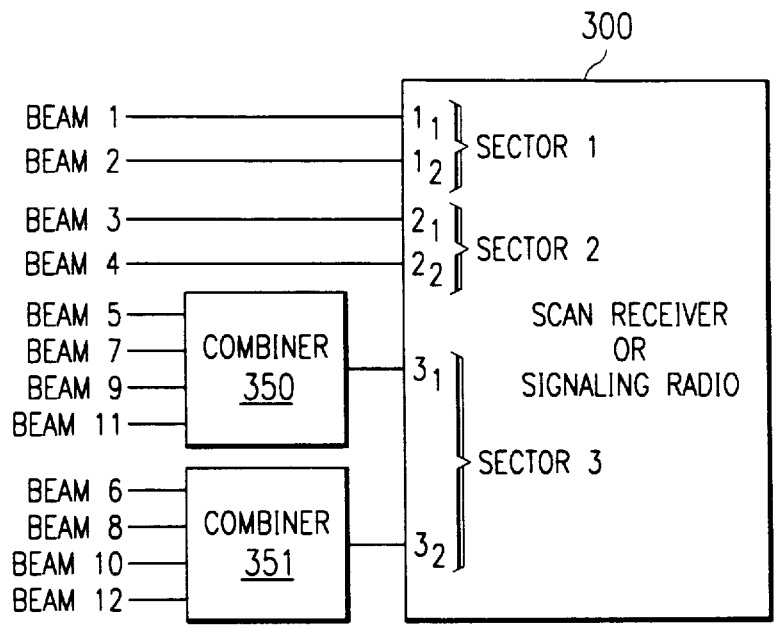
FIG. 3A illustrates a block diagram of a communication system wherein multiple beams are combined to provide various sector sizes according to the present invention.

FIG. 3A illustrates an implementation resulting in the above described three sector system having two 60° sectors and one 240° sector. With reference to FIG. 3A, signaling/scan Rx 300 is a typical prior art scan receiver or signaling radio having two inputs per sector. Here the inputs associated with a first sector are identified as inputs $1_1$ and $1_2$. Likewise, the inputs associated with a second and third sector are identified as inputs $2_1$ and $2_2$ and $3_1$ and $3_2$ respectively. Therefore, where beams 1 though 12 are associated with a 12 beam system, wherein each beam has a 30° azimuthal width such as illustrated in FIG. 2, the sector sizing is as described above. Specifically, sector 1 having a 30° beam 1 and a 30° beam 2 associated with inputs $1_1$ and $1_2$ provides a 60° sector. Similarly, sector 2 having a 30° beam 3 and a 30° beam 4 associated with inputs $2_1$ and $2_2$ provides a 60° sector.

As signaling/scan Rx 300 only provides two inputs per sector, additional circuitry is necessary in order to input the plurality of beams remaining as a third sector. In a preferred embodiment, signal combiners 350 and 351 are utilized to combine the signals provided by the remaining beams of the system into the proper number of discrete signals suitable for input into the signaling/scan Rx utilized by the present invention.

Through the use of signal combiners, sector sizing is accomplished by summing together the beam signals so as to increase the size of the sector signal provided to the signaling/scan Rx. Of course, where a signaling/scan Rx having a sufficient number of inputs to accommodate such a plurality of signals is utilized, the use of additional circuitry, such as combiners 350 and 351, may be eliminated, if desired. Likewise, the use of circuitry other than signal combiners, such as multiplexers, may be utilized according to the present invention, if desired. However, it shall be appreciated that the signal combiners are utilized in the preferred embodiment as signals from the various combined beams are provided to the signaling/scan Rx simultaneously, providing simultaneous communication throughout the beams of the sector, rather than in time division multiple access (TDMA) format as is the case in the use of a typical multiplexer. Of course, where TDMA signals or multiplexing by other schemes, such as frequency division multiple access (FDMA), are acceptable, multiplexers may replace the signal combiners of the preferred embodiment.

Because the signalling radio utilizes both forward and reverse links, circuitry providing forward link sector sizing consistent with that of the reverse link discussed above may also be provided. For example, where the signaling radio utilizes different signaling channels per sector, the circuitry illustrated in FIG. 3B may be utilized to transmit these signalling channels within the same sectors as those of the reverse link illustrated in FIG. 3A.

Figure 3B:
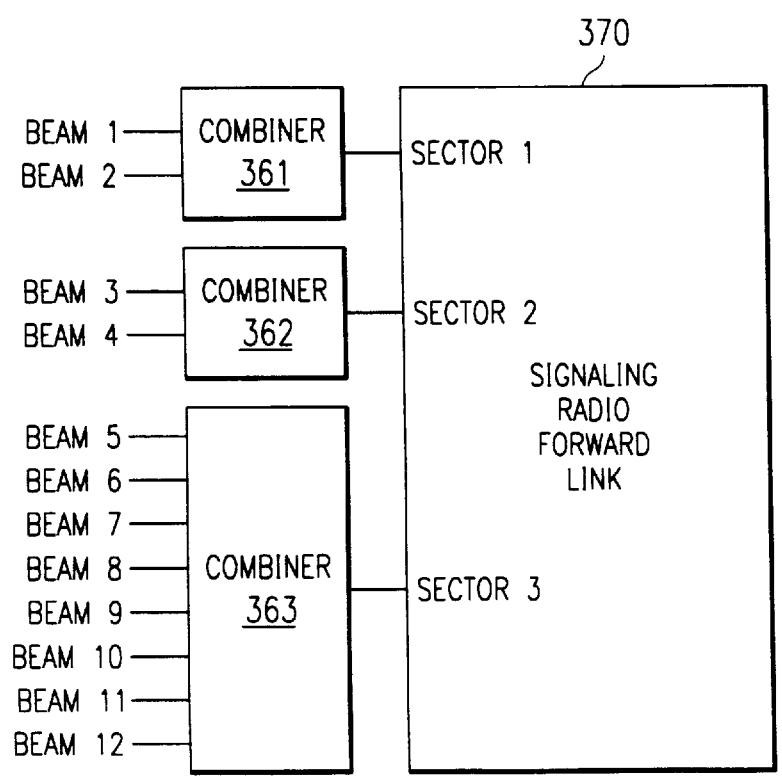
FIG. 3B illustrates a block diagram of the combining of multiple beams for the forward link of a signaling radio to match the various sector sizes of the system illustrated in FIG. 3A.

It shall be appreciated that the circuitry of FIG. 3B is substantially the same as that of FIG. 3A. However, as typical prior art signaling radios generally have only one output per sector, all beams associated with a particular sector are coupled to this output. For example, the three sector outputs of signaling radio 370 illustrated in FIG. 3B each include combiners to provide an output signal to sectors including the same number of beams as the reverse link illustrated in FIG. 3A. Specifically, combiners 361 and 362 provide signals to beams 1 and 2, and 3 and 4 respectively. Likewise, combiner 363 provides signals to beams 5 through 12.

It shall be appreciated that the system illustrated in FIG. 3A establishes two adjacent 60° sectors and is, therefore, able to provide the total number of channels available in two sectors in the same area as a single prior art 120° sector. Using the previous example where 60 available channels are divided evenly among the three sectors, each sector would have 20 channels associated therewith. Therefore, the capacity provided by the combination of sectors 1 and 2 sectors is a total of 40 channels within the associated 120° azimuthal width, rather than the 20 channels available in the single 120° sector of the prior art.

Of course, the above mentioned increase of channel density within the 120° area of interest is at the expense of available channels in the remainder of the cell. In the above example only 20 channels of the 60 total channels would remain available in the remaining 240° sector. However, it shall be appreciated that such a system is advantageous where the users of a particular cell are more heavily concentrated within a particular area within the cell rather than evenly distributed throughout. Such usage patterns may be experienced, for example, where a cell is located to include a commuter highway in its radiation pattern, or is located on the edge of a metropolitan area. Such cells might experience heavy user densities in particular areas as the user population commutes to and from work.

It shall be appreciated from the above discussion, that usage patterns which may advantageously be addressed by the present invention may change at various times of the day or week. For example, the previously described cell overlapping a commuter highway may see heavy utilization in a particular area during worker commuting times, and a more evenly distributed utilization pattern at other times. Similarly, a cell placed at the edge of a metropolitan area may see heavy utilization in an area encompassing the metropolitan area during working hours and heavy utilization in an area outside the metropolitan area during nonworking hours. Therefore, it becomes obvious that further advantage may be realized by the system of the present invention by providing means by which the sizable sectors may be dynamically adjusted to accommodate the varying utilization patterns of a cell.

Figure 4:
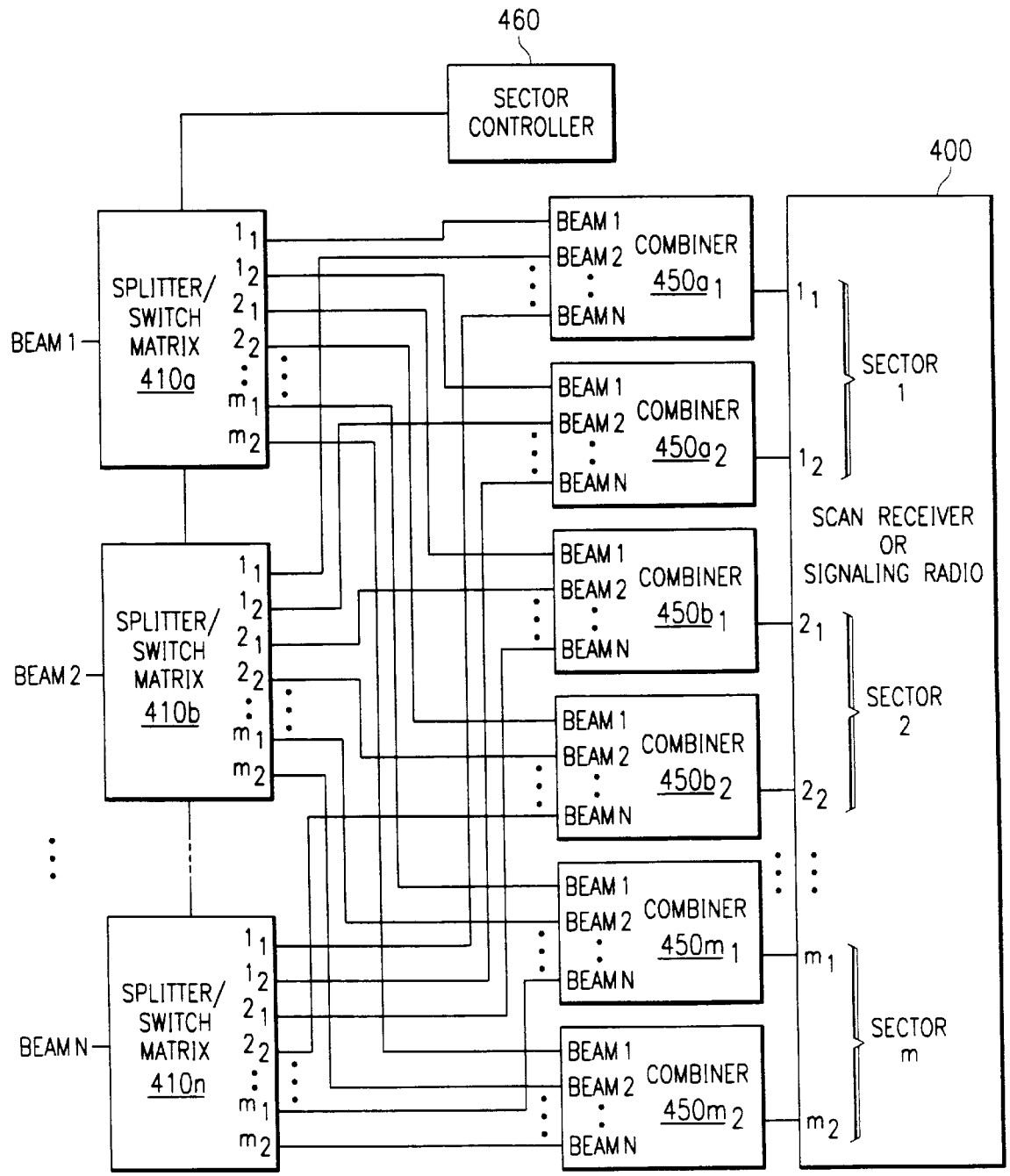
FIG. 4 illustrates a block diagram of a communication system wherein multiple beams are dynamically combined to provide selectable sector sizes according to the present invention.

FIG. 4 illustrates a preferred embodiment of the interface of signals from the various beams of a multi-beam system into a signaling radio, or scan receiver, enabling a flexible sector/cell system of the present invention. Here, as in the system illustrated in FIG. 3A described above, signal combiners are provided to allow the input of multiple beams into the sector inputs of signaling/scan Rx 400 having M sectors. However, it shall be appreciated that, in order to provide for the input of a signal associated with any beam to any sector input, a signal combiner, illustrated as combiners 450$a_1$, 450$a_2$, 450$b_1$, 450$b_2$, 450$m_1$, and 450$m_2$, is associated with each sector input of signaling/scan Rx 400.

Furthermore, in order to provide a signal at any combination of the above described combiners, and thus the associated sector input of signaling/scan Rx 400 (i.e., providing the same signal at a plurality of sector inputs simultaneously), signals from the N beams are provided to splitter/switch matrixes associated with each beam; illustrated here as splitter/switch matrix 410$a$, 410$b$, and 410$n$. It shall be appreciated that each splitter/switch matrix splits the signal of an associated beam so as to be available for switchable connection to any combination of the aforementioned combiners. For example, the signal associated with beam 1 may be split M ways (so as to be available for input to signaling/scan Rx inputs associated with each of the M sectors) and be switchably connected to any combination of combiners by splitter/switch matrix 410$a$.

Of course, the function of the disclosed splitter/switch matrixes may be accomplished by utilizing a separate splitter in combination with a switch matrix having the proper number of inputs and outputs to provide for the switching of a signal associated with a beam to any combination of combiners. Moreover, signal amplification circuitry may be included in, or in addition to, the splitter circuitry of the preferred embodiment to provide a split signal having an acceptable magnitude. Such signal amplification may be provided in order to present each signal component of the original signal at a power level, or magnitude, substantially the same as the signal prior to its being split. Likewise, such signal amplification may be to present a split signal having a sufficient power level, or magnitude, to provide an acceptable signal to noise ratio. Where the original signal is split to provide a large number of split signal components, such amplification may be necessary in order to provide a signal having an acceptable signal to noise ratio to the inputs of signaling/scan Rx 400.

Of course, where it is not desired to provide the signal associated with a particular beam to more than one signal combiner, and thus its associated sector input, the splitter/switch matrixes of the present invention may omit the functionality of signal splitting, if desired. However, it shall be understood that omission of signal splitting, or a similar method of provision of multiple instances of the same signal information, is at the cost of the ability to provide overlapping coverage by the various sectors as is discussed hereinbelow.

Additionally, where it is not desired to allow for the input of a signal associated with each beam of the system to all sector inputs of the signaling/scan Rx, the number of outputs of the splitter/switch matrixes, as well as their associated combiner inputs, may be less than the total number of beams. However, it shall be appreciated that such a system is limited in ability to size a sector as the sector size is a function of the beam width and number of beams combined into a sector input.

By properly adjusting the splitter/switch matrixes of the present invention, various predetermined sector sizes may be realized. For example, the aforementioned combination of two 60° sectors and a single 240° sector may be realized in the following manner. By adjusting splitter/switch matrix 410$a$, the signal of beam 1 may be provided exclusively to combiner 450$a_1$ associated with a first input of sector 1. Likewise, by adjusting splitter/switch matrix 410$b$, the signal of beam 2 may be provided exclusively to combiner 450$a_2$ associated with a second input of sector 1. By similarly adjusting a second pair of splitter/switch matrixes (not shown, but represented by the ellipsis between splitter/switch matrixes 410$b$ and 410$n$), associated with a third and fourth beam (not shown, but represented by the ellipsis between beams 2 and N), a second 60° sector may be defined. Similarly, adjusting an additional eight splitter/switch matrixes, associated with a remaining eight beams of a twelve beam system, such as that illustrated in FIG. 2, a third 240° sector may be defined. However, in this third sector, it shall be appreciated that adjusting of the remaining eight splitter/switch matrixes results in a combination of four beam signals switched to each of the two combiners associated with the third sector; illustrated here as combiners 450$m_1$ and 450$m_2$.

It shall be appreciated that the aforementioned arrangement has established a system wherein two 60° sectors and a single 240° sector, as described above with reference to FIG. 3A. However, it shall be appreciated that the splitter/switch matrixes of the embodiment illustrated in FIG. 4, may be adjusted to provide sectors of sizes different than those describe above.

Of course, selection of the size of the various sectors of the present invention may be made by manually adjusting the splitter/switch matrixes. Such manual adjustment may be acceptable where, for example sector sizes are rarely, if ever, changed. However, as discussed above, it is envisioned that the sectors of the present invention will advantageously be adjusted depending on different utilization patterns throughout any given day or week. Therefore, in a preferred embodiment, a control signal is provided to adjust splitter/switch matrixes 410$a$ through 410$n$ in order to dynamically select sector sizes.

Referring to FIG. 4, a control signal is provided each splitter/switch matrix by sector controller 460. It shall be understood that, although a single control interface is illustrated between all of the splitter/switch matrixes, each of these splitter/switch matrixes may be controlled independently by controller 460. Of course, sector controller 460 need not be a discrete component associated with the cell site, but may instead be an integral part of the cell's existing control circuitry. Moreover, sector controller 460 may be included as a part of a centralized control system, utilized to control a network of neighboring cell sites, rather than being embodied within the particular cell site it is associated with.

Sector controller 460 may comprise a processor-based system having a processing unit (CPU) and memory associated therewith (RAM). The RAM may have stored therein an algorithm operable to cause the CPU to adjust the splitter/switch matrixes of the present invention to switchably connect the signals of the various beams to predetermined ones of the sector inputs at various times of the day or week. Such an algorithm may be based on past or projected utilization patterns and incorporate no information on the actual utilization pattern of the cell.

Alternatively, as utilization patterns are often unpredictable and subject to change unexpectedly, in a preferred embodiment, sector controller 460 includes current utilization information, such as may be determined by controller 460 or may be provided by the cell's existing control circuitry. This current utilization information may include such information as the number of users associated with particular sectors, the number of available channels, or other resources, of particular sectors, or the signal quality associated with particular sectors or particular users within the sectors. From this information, sector controller 460 may adjust the splitter/switch matrixes of the present invention to provide alternative sector sizing and thus increase the number of channels, or other resources, available to a particular area within the cell, or improve signal quality associated with a sector or user.

Additionally, or in the alternative, sector controller 460 may be provided with current utilization information from a centralized apparatus (not shown) controlling a plurality of neighboring cells. Such a centralized apparatus may be provided information from each of the neighboring cells in order to make decisions as to the allocation of the various resources of the system, such as the re-use of channels at neighboring cells, the handing off of users between the cells, and the sizing of sectors at neighboring cells to provide increased capacity or signal quality. Management of such a system within a neighborhood of cells is disclosed in the above referenced co-pending and commonly assigned U.S. patent application entitled "METHOD AND APPARATUS FOR IMPROVED CONTROL OVER CELLULAR SYSTEMS."

It shall be appreciated that, as discussed above, communication within a particular sector of a cell of a cellular system is not only a function of other communications within that sector or even other sectors of that cell, but may also be affected by communications within neighboring cells. Therefore, an alternative embodiment of the present invention includes means by which to adjust the sector's effective outboard reach or length, as referenced in the direction of propagation of the radiation. It shall be appreciated that reduction of the longitudinal size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers. Thus, a system of cells utilizing the present invention may be used to provide increased signal quality as well as increased capacity without increasing the number channels available at each cell.

The above mentioned sector outboard shaping may be accomplished by putting attenuators (not shown) in the signal path between an antenna element associated with a particular beam and the signal's input into the signaling/scan Rx, such as between each output of splitter/switch matrix 410$a$ and the associated inputs of combiners 450$a_1$ through 450$m_2$. Such attenuators may be utilized to adjust the power of a received signal prior to its input into the signaling/scan Rx. Therefore, the signaling/scan Rx may be convinced that a particular beam is providing a lower input signal strength than is actually being received. As such, the signaling/scan Rx can be artificially manipulated to either cause an in sector hand off or a hand off to another cell.

It shall be appreciated that, since the cell site scan receiver typically receives a control signal from the cell site telling it which voice channel to scan, it is possible to switch only the two beams having the strongest signal on this channel to the scan receiver to accomplish the above described advantages and functions. Likewise, the signaling radio can be operated in a similar manner in the reverse link. For the signaling radio a signal detector may be used to determine the beams having the strongest reception of the control channel signal and then only those beams need be switched to the signaling radio. This allows the cell to control which sector a call originates on, and therefore the sector size, depending upon which port of the signaling radio the beams are routed to.

Figure 6:
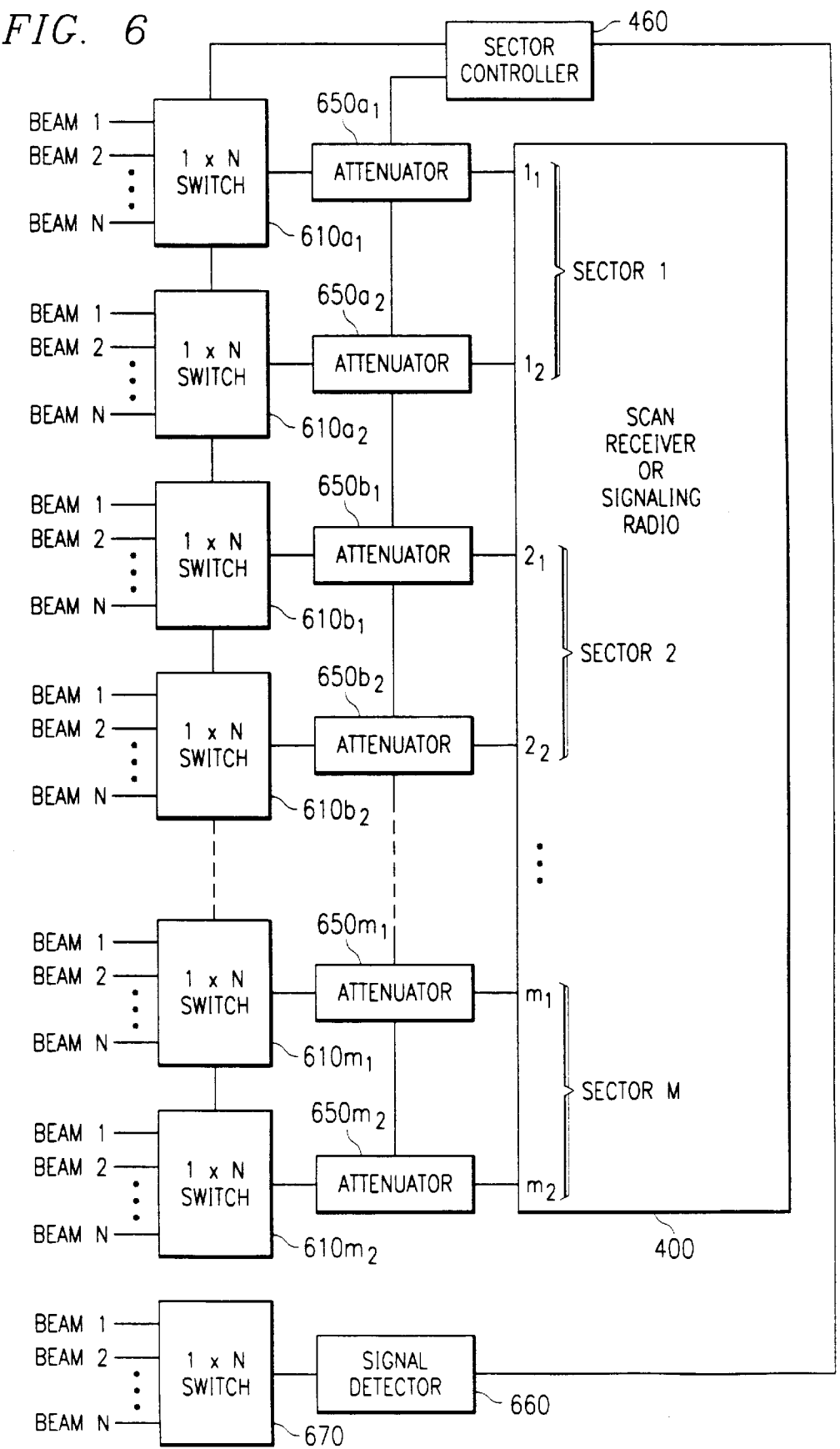
FIG. 6 illustrates a block diagram of a communication system wherein particular signals of interest may be dynamically routed and attenuated to provide selectable sector sizing according to the present invention.

Directing attention to FIG. 6, an alternative embodiment of the present invention is illustrated suitable for providing the signals of the two beams receiving the strongest signal of interest, i.e., the signalling control channel or a particular voice channel, to signaling/scan Rx 400. It shall be appreciated that this embodiment does not utilize combiners 450$a_1$ through 450$m_2$ as only the beams having the strongest received signal of interest will be switched to a particular input of signaling/scan Rx 400.

Because only the beams having the strongest receive signal of interest are switched to the input of signaling/scan Rx 400, the number of switch matrixes utilized in this embodiment is associated with the number of sector inputs of signaling/scan Rx 400 rather than the number of beams as in the above described embodiment. Therefore, in order to provide a signal from any beam to a selected sector input of signaling/scan Rx 400, signals from each of the N beams are provided to switch matrixes associated with each sector input; illustrated here as switch matrixes 610$a_1$ through 610$m_2$. It shall be appreciated that the use of such switch matrixes may be utilized to provide signals from any beam to multiple sector inputs simultaneously and, thus, provide overlapping coverage by the various sectors as is discussed hereinbelow.

As in the embodiment discussed above, the switch matrixes of this embodiment are controlled by a control signal provided each switch matrix by sector controller 460. It shall be understood that, although a single control interface is illustrated between all of the switch matrixes, that each of these switch matrixes is controlled independently by controller 460. Of course, sector controller 460 need not be a discrete component associated with the cell site, but may instead be an integral part of the cell's existing control circuitry. Moreover, sector controller 460 may be included as a part of a centralized control system, utilized to control a network of neighboring cell sites, rather than being embodied within the particular cell site it is associated with.

As with the above discussed embodiment, sector controller 460 may comprise a CPU and RAM to control the sectors according to the present invention, such as through the use of an algorithm basing switching decisions on past or projected utilization patterns or an algorithm basing such decisions on current utilization as determined from this cell or a neighborhood of cells. Current utilization information may be determined by controller 460 or may be provided by the cell's existing control circuitry. Sector controller 460 may also be provided with current utilization information from a centralized apparatus (not shown) controlling a plurality of neighboring cells. As discussed in detail above, this current utilization information may include such information as the number of users associated with particular sectors or cells, the number of available channels, or other resources, of particular sectors or cells, or the signal quality associated with particular sectors, cells or users.

It shall be appreciated, in order to determine which of the strongest beams with respect to the signal of interest, that signal strength detection means is necessary. Referring to FIG. 6, signal detector 660 is provided to determine the beams having the strongest received signal strength with respect to the signal of interest. To provide each of the beam signals to signal detector 660, switch matrix 670 is provided. It shall be appreciated that switch matrix 670 allows signal detector 660 to sample the signal associated with each beam of the antenna system, although not simultaneously. Typically, such sampling is acceptable to determine the beams having the strongest signal strength of a particular signal. Of course, where such sampling is not acceptable, additional circuitry could be utilized providing simultaneous signal detection on each of the beams, if desired.

Information regarding the beams having the strongest receive signal is provided to sector controller 460 through the interface between the sector controller and signal detector 660. It shall be appreciated that such information may be utilized by sector controller 460 to adjust switch matrixes 610$a_1$ through 610$m_2$ such that these beams may be switched to the proper sector inputs as described above. It shall be understood that, although a single control interface is illustrated between all of the switch matrixes, each of these switch matrixes may be controlled independently by controller 460.

As the scan receiver scans for a particular voice channel (the signal of interest), as indicated by a message from the cell site controller, the signal detector may intercept this information in order to provide the sector controller with information regarding the signal of interest. For example, information regarding the signal of interest may be provided to the signal detector through a link with the cell site controller (not shown). The signal detector may then sample signals from each beam in order to determine the beam having the strongest signal with respect to this signal of interest.

Similarly, where the signaling radio utilizes different signaling channels per sector, information regarding the signaling channel of interest may be provided to the signal detector through a link with the cell site controller (not shown). The signal detector may then sample signals from each beam in order to determine the beam having the strongest signal with respect to this signal. Of course, where sampling individual channels is not acceptable, additional circuitry could be utilized providing simultaneous signal detection on multiple channels, if desired.

It shall be appreciated that, as discussed above, communication within a particular sector of a cell of a cellular system is not only a function of other communications within that sector or even other sectors of that cell, but may also be affected by communications within neighboring cells. Therefore, this embodiment of the present invention includes means by which to adjust the sector's effective outboard reach or length, as referenced in the direction of propagation of the radiation. It shall be appreciated that reduction of the longitudinal size of the sector thereby decreases the amount of interference sent into adjacent cells as communication devices operating within the adjusted sector are limited in the distance from the center of the cell that they may operate. As a result, the adjacent cells may open up their sectors into larger areas to serve more customers. Thus, a system of cells utilizing the present invention may be used to provide increased signal quality as well as increased capacity without increasing the number channels available at each cell.

The above mentioned sector outboard shaping is preferably accomplished through adjusting attenuators 650$a_1$ through 650$m_2$ provided in the signal paths between the switch matrixes and the signaling/scan Rx sector inputs. These attenuators may be utilized to adjust the power of a received signal prior to its input into the signaling/scan Rx. As described above with respect to the switch matrixes, each of the attenuators may be individually controlled by controller 460. Therefore, the signaling/scan Rx may be convinced that a particular signal is being received at a lower strength than is actually being received. As such, the signaling/scan Rx can be artificially manipulated to either cause an in sector hand off or a hand off to another cell.

It shall be appreciated, although outboard shaping may be accomplished through the use of attenuators with either of the above described embodiments, that the alternative embodiment illustrated in FIG. 6 utilizes a number of such attenuators equal to the sector inputs of signaling/scan Rx 400. Such an arrangement of attenuators allows the sector controller to adjust a signal strength of the signal of interest independently at any or all of the sector inputs.

However, in order to independently adjust a signal strength of the signal of interest independently at each of the sector inputs with the embodiment illustrated in FIG. 4, the number of attenuators must equal the number of beams times the number of sector inputs. This is because if fewer attenuators were used, such as by placing them between the beam signal source and the splitter/switch matrixes 410$a$ through 410$n$ or between combiners 450$a_1$ through 450$m_2$ and the sector inputs, the signal strength for multiple sector inputs or for multiple beams would be adjusted rather than their being independently adjusted. The former would result in all signals received on a particular beam being adjusted similarly regardless of the sector input it is to be input into. The latter would result in all signals input into a sector input being adjusted similarly regardless of the beam from which it originated.

In contrast, independent adjusting of the signals through the use of fewer attenuators is accomplished by the embodiment illustrated in FIG. 6 by utilizing the additional information with respect to the signal of interest. Here, concurrent with the signaling/scan Rx scanning a particular signal, the proper beams receiving that signal can be switched to the desired sector input as well as the attenuators adjusted accordingly. Thereafter, when the signaling/scan Rx scans another particular signal, the beams receiving this signal can be switched to the desired sector input and the attenuators adjusted accordingly.

It shall be appreciated that attenuation of ones of the various signals associated with the beams of the present invention effectively decreases the outboard, or longitudinal, size of the sector including that beam, thereby decreasing the size of the sector or cell. For example, increasing the amount of the attenuation of an attenuator associated with a particular beam, which translates into a reduction in signal strength of that beam, which beam's signal is routed to a particular input port of the signaling/scan Rx results in the reduction of the range of this antenna beam of the system as seen at the input port of the signaling/scan Rx. Where the sector is split into a 60° system, as described above, for example, the signals on the two antenna beams could be attenuated by a select amount of and, thus, reduce the range of this particular sector of the cell to a predetermined length.

The above mentioned forced hand off of users of a particular sector/cell by attenuating the signal received from the user may be advantageous where the handed off user, or other user of the cell, has an interference problem, such as might be caused by co-channel interference or an undesirable carrier to noise ratio. The forced hand off of a particular user could be utilized to improve signal quality by providing the user with a better signal from another sector/cell.

For example, where there is interference as a result of using certain channels on the two beams comprising the above discussed 60° sector, by utilizing attenuators in the signal path an effective reduction in the size of that specific sector could be accomplished. As a result of the reduced effective sector size, communication devices in the sector would be handed off to be serviced by an adjacent sector or cell, thereby reducing the interference that this sector is causing other users.

Figure 5:
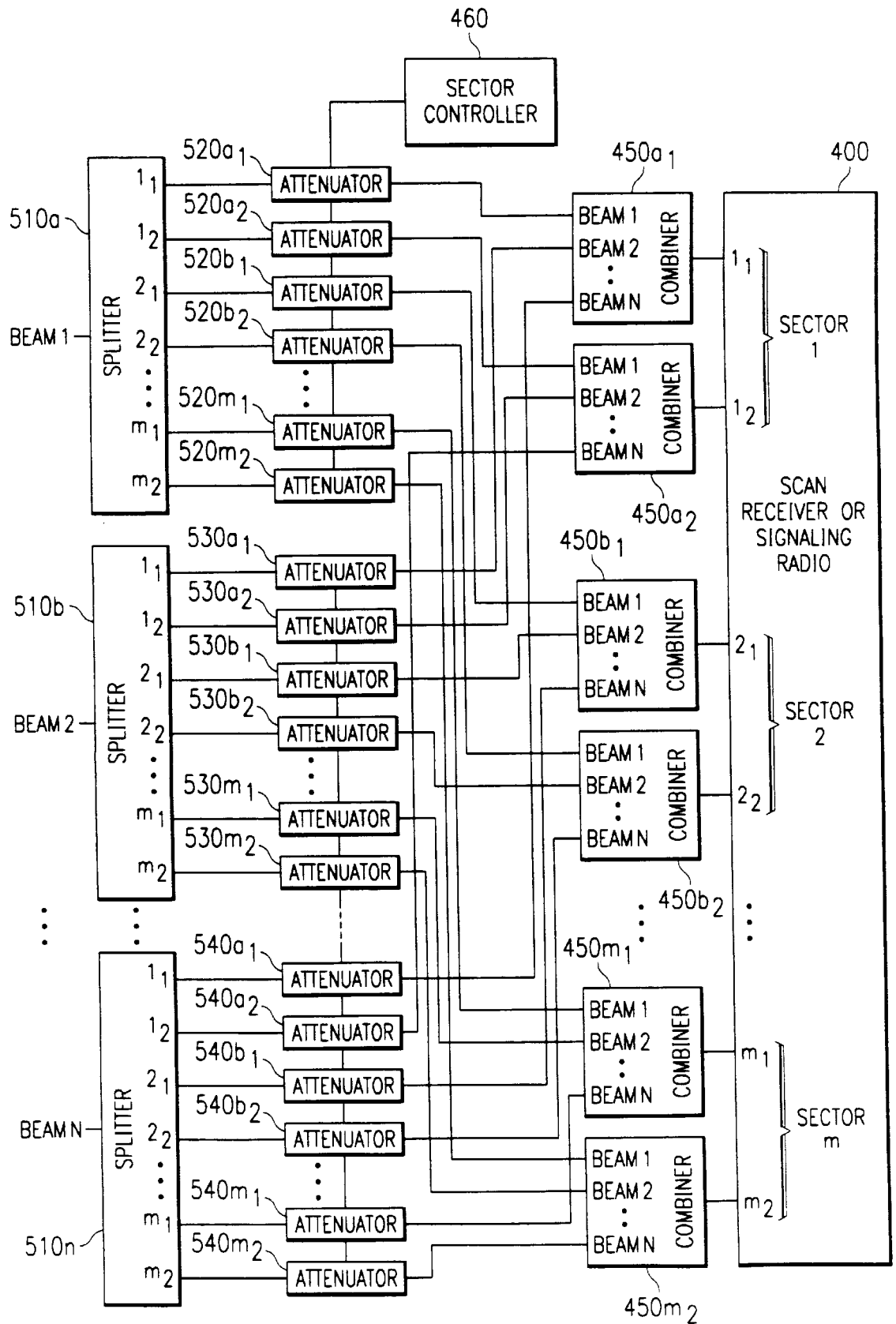
FIG. 5 illustrates a block diagram of a communication system wherein signals associated with multiple beams may be dynamically attenuated and combined to provide selectable sector sizing according to the present invention.

Recognizing that interruption in a signal path may be accomplished by an attenuator adjusted to provide impedance approaching infinity, or an open circuit, an alternative preferred embodiment of the present invention utilizes attenuators exclusive of switch matrixes, as is illustrated in FIG. 5. Of course, as previously discussed, attenuators can be utilized within the signal paths of the switches of FIG. 4 or 6 to provide signal attenuation in addition to signal switching, if desired.

Referring to FIG. 5, it can be seen that signals associated with the various beams are provided signaling/scan Rx 400 through the signal combiners $450a_1$ through $450m_2$ as in the embodiment illustrated in FIG. 4. However, the splitter/switch matrix of the previously discussed embodiment have been replaced with splitters 510a through 510n in combination with attenuators $520a_1$ through $520m_2$, $530a_1$ through $530m_2$, and $540a_1$ through $540m_2$. Of course, the splitters and associated attenuator sets may be combined into a single apparatus, much like the splitter/switch matrixes of FIG. 4, if desired.

Referring again to FIG. 5, a control signal is provided each attenuator by sector controller 460. It shall be appreciated, although a single control interface is illustrated between controller 460 and the attenuators of this embodiment, that each of the attenuators may be independently adjusted by sector controller 460. As in the above described embodiment, sector controller 460 need not be a discrete component associated with the cell site, but may instead be an integral part of the cell's existing control circuitry. Similarly, sector controller 460 may be included as a part of a centralized control system, utilized to control a network of neighboring cell sites, rather than being embodied within the particular cell site it is associated with.

As previously mentioned, sector controller 460 may comprise a CPU and RAM. This RAM may have stored therein an algorithm operable to cause the CPU to adjust the attenuators of the present invention to increase their impedance to approach infinity, to result in a discontinuation of a particular signal path, or to decrease impedance, to result in variously attenuated signal paths ("switching"). It shall be appreciated that such adjustment results in the switching of the signals of the various beams, at various power levels, to predetermined ones of the sector inputs. Such switching may be at various times of the day or week as was the case in the aforementioned embodiment.

Switching by such an algorithm may be based on past or projected utilization patterns and incorporate no information on the actual utilization pattern of the cell. Alternatively, in a preferred embodiment, sector controller 460 includes current utilization information input such as may be determined by controller 460 or may be provided by the cell's existing control circuitry. This current utilization information may include such information as the number of users associated with particular sectors, the number of available channels, or other resources, of particular sectors, and the signal quality associated with particular sectors or particular users within the sectors. From this information, sector controller 460 may adjust the attenuators of the present invention to provide alternative sector sizing, either by establishing/discontinuing a signal path associated with a particular beam to a particular sector input or by increasing/reducing the effective longitudinal size of beams of a particular sector, and thus increase the number of channels, or other resources, available to a particular area within the cell, or improve signal quality associated with a sector or user.

Additionally, or in the alternative, sector controller 460 may be provided with current utilization information of a plurality of neighboring cells from a centralized apparatus as described above. Such a centralized apparatus may be provided information from each of the neighboring cells in order to make decisions as to the allocation of the various resources of the system, such as the re-use of channels at neighboring cells, the handing off of users between the cells, and the sizing of sectors at neighboring cells to provide increased capacity or signal quality.

It shall be appreciated that, although the use of two 60° and one 240° sector has been discussed in the above examples, such sector sizing is purely in the way of example and is in no way intended to be a limitation of the present invention. Any number of beams may be composited into sectors according to the present invention. For example, the present invention could be utilized to provide a single 60° sector concurrent with two 150° sectors. Likewise, the present invention is equally suited to provide homogeneous sectors, such as the three 120° sectors of the prior art systems.

Additionally, it is also possible, according to the present invention, to provide all of the beams to each sector input to essentially provide an omni cell site. For example, in the twelve beam system described herein, signals from all twelve beams would be provided to inputs associated with each sector of the signaling/scan Rx. Here, instead of having 120° per sector as in the prior art, each sector covers a full 360°, or using the above described two input signaling/scan Rx, 180° per each sector input. For example, using every other beam for input number 1 and every other beam for input number 2 associated with a first sector, this first sector now covers a full 360° about the cell site. Similarly, the two inputs associated with the remaining sectors may be provided signals from each beam. This results in each sector having 360° azimuthal coverage in the back tune configuration and, therefore, each channel, regardless of the sector with which it is associated, being available throughout the cell.

Similarly, it is also possible to combine signals from the same beams into sector inputs of two or more sectors to essentially provide overlapping sectors of various sizes. For example, in the twelve beam system described herein, signals from six of the beams could be provided to inputs associated with the first two sectors of the signaling/scan Rx. Here, instead of having 120° per sector as in the prior art, each sector covers 180°; the first and second sector providing 180° overlapping coverage and the third sector providing coverage for the remaining 180°. For example, using every other beam of the first six beams for input number 1 and the remaining beams of this six for input number 2 associated with a first sector, this first sector now covers 180° about the cell site. Likewise, using every other beam of the first six beams for input number 1 and the remaining beams of this six for input number 2 associated with a second sector, this second sector also covers the same 180° about the cell site as the first sector. Coverage for the remaining 180° may be provided by using every other beam of the last six beams for input number 1 and the remaining beams of this six for input number 2 associated with a third sector. Such overlapping sector configurations provide the channels associated with each overlapping sector throughout the area of overlap.

Although the use of alternating adjacent beams has been discussed with respect to the two inputs associated with a particular sector of the signaling/scan Rx, it shall be appreciated that the present invention is not limited to such an input arrangement. Signals from adjacent beams may be combined by a signal combiner to the same input of a sector input pair according to the present invention.

However, it shall be appreciated that inputting adjacent beam signals to alternate inputs of a sector input pair is preferred so as to provide a better quality signal by increasing signal diversity between the signals input to each input of the sector input pair. Through the angular diversity associated with the collocated beam sources disposed to "see" different wave fronts, adjacent beam signals provided to alternate inputs of a sector input pair may provide signal diversity where adjacent beam signals provided to the same inputs of a sector input pair may not. For example, where a communication device is located such that its signal is received only within two adjacent beams of a four beam sector, provision of these two adjacent beam signals to a single sector input would not provide signal diversity whereas alternating input of adjacent beams to the sector input pair of the signaling/scan Rx would provide signal diversity.

Furthermore, it shall be appreciated that, although a three sector system has been discussed, the present invention is not limited to the provision of three sectors. The present invention may provide dynamic sector sizing of any number of sectors controllable by the associated signaling/scan Rx. For example, the present invention may provide two sectors rather than the three discussed. Similarly, the present invention may provide a number of sectors in excess of the three sectors described in a preferred embodiment, such as is represented by the M sectors of signaling/scan Rx 400.

Similarly, it shall be understood that the present invention is not limited to the provision of two signals per sector input. By using various arrangements of the aforementioned switch matrixes and/or attenuators in combination with signal combiners (if needed), the present invention may provide a number of signals associated with particular beams to any number of sector inputs.

Furthermore, it shall be understood that the present invention is not limited to utilization of a twelve beam system as described herein. Any number of beams may be utilized to provide the dynamically sizable sectors of the present invention. Of course, where the number of beams utilized is different than discussed above, the individual beam width may be greater or less than the 30° beam width used in the above examples. Therefore, it shall be appreciated that use of a different number of beams may result in a different minimum sector width as a result of combining such beams.

Moreover, it shall be appreciated that the use of equally sized beams is not a limitation of the present invention. Beams of different azimuthal width may be utilized to provide the dynamically sizable sectors of the present invention. For example, where a particular area within a cell is likely to be utilized by only a limited number of users, such as where the cell overlays a mountainous region causing signal shadows or where the cell includes other areas of limited user access, i.e., an ocean, a few beams may be sized to substantially cover this area so as not to necessitate the provision of a number of beams for a very few possible users.

Although the present invention and its advantages have been described in detail, it should be understood that various changes, substitutions and alterations can be made herein without departing from the spirit and scope of the invention as defined by the appended claims.

What is claimed is:

1. A system for dynamically adjusting a sector size of a plurality of sectors of a radiation pattern, the radiation pattern impacting a communication device having a plurality of inputs, wherein ones of said plurality of inputs are associated with a particular sector of said plurality of sectors of said radiation pattern, said system comprising:

means for providing a plurality of predefined narrow beams composited to form said radiation pattern, each beam having a discrete signal associated therewith suitable for input into particular inputs of said plurality of inputs, wherein a sector of said plurality of sectors is at least in part defined as a function of ones of said discrete signals input into a same particular input of said communication device; and means for periodically altering said ones of said discrete signals input into said same particular input of said communication device.

2. The system of claim 1, wherein a width of at least one of said sectors is at least in part defined as a function of a number of said discrete signals input into said same particular input of said communication device.

3. The system of claim 2, wherein ones of said sectors overlap, said sector overlap being a function of ones of said discrete signals being simultaneously input into a plurality of inputs of said communication device, ones of said plurality of inputs being associated with different sectors of said plurality of sectors.

4. The system of claim 1, further comprising:

means for adjusting a power level of at least one signal associated with said plurality of beams, wherein a length of at least a portion of one of said sectors is determined by power level adjustment of said signal input into said particular input of said communication device.

5. The system of claim 4, wherein said power level adjusting means comprise said periodic altering means, said periodic altering of said ones of said discrete signals input into said same particular input of said communication device being accomplished by adjusting said power level adjusting means to result in a signal having an insignificant power level input into select signal inputs of said plurality of inputs.

6. The system of claim 1, wherein said periodic altering means comprises:
  means for substantially automatically altering said sector sizes as a function of a communication parameter.

7. The system of claim 6, wherein said communication parameter comprises information determined by said system.

8. The system of claim 6, wherein said communication parameter comprises information provided by a centralized controller operating to control a plurality of cooperating communication devices.

9. The system of claim 6, wherein said communication parameter comprises information regarding a particular channel within said beam signals of interest to said communication device.

10. The system of claim 9, wherein said information comprises a beam of said plurality of beams having a strongest receive signal strength of said particular channel.

11. A system for providing a plurality of variable size sectors in a radiation pattern including a plurality of predefined beams each providing a discrete beam signal suitable for input into a communication device having a plurality of inputs, wherein ones of said plurality of inputs are associated with a particular sector of a plurality of sectors in said radiation pattern, said system comprising:
  a plurality of beam signal path control means for providing ones of said plurality of beam signals to select said inputs of said communication device, wherein a sector of said plurality of sectors is defined at least in part as a function of said beam signals provided to a same said input of said communication device; and
  a plurality of signal combining means for combining into a composite signal ones of said plurality of beam signals to be provided to a same said select input of said communication device by said beam signal path control means, wherein at least one of said plurality of signal combining means is disposed between each of said beam signal path control means and each of said communication device inputs.

12. The system of claim 11, wherein an azimuthal size of said variable size sectors is a function of a number of said beam signals provided to said inputs of said communication device associated with a particular sector.

13. The system of claim 11, wherein at least one of said plurality of beam signal path control means comprise a switch matrix, said switch matrix adapted to switchably connect a beam signal to ones of said communication device inputs through said signal combining means.

14. The system of claim 13, further comprising:
  attenuation means for attenuating at least one beam signal of said plurality of beam signals, wherein attenuation of said beam signal is operable to adjust a longitudinal size of at least a portion of a variable size sector of said plurality of variable size sectors.

15. The system of claim 11, further comprising:
  signal splitting means for splitting ones of said plurality of beam signals into beam signal components suitable for simultaneous provision to more than one input of said plurality of inputs of said communication device.

16. The system of claim 15, wherein at least one of said plurality of beam signal path control means comprise a switch matrix, said switch matrix adapted to switchably connect said beam signal components associated with a particular beam to any combination of said communication device inputs through said signal combining means.

17. The system of claim 15, wherein at least one of said plurality of beam signal path control means comprise a set of signal amplifier/attenuators, each attenuator of said set disposed to provide amplification/attenuation of a beam signal component of said beam signal components associated with a particular beam to a particular input of said communication device through said signal combining means, wherein high order attenuation of said beam signal component substantially interrupts communication of said beam signal component to said particular input.

18. The system of claim 17, wherein a longitudinal size of said variable size sectors is a function of amplification/attenuation of said beam signal components provided to said inputs of said communication device associated with a particular sector.

19. The system of claim 17, wherein an azimuthal size of said variable size sectors is a function of a number of said beam signal components provided to said inputs of said communication device associated with a particular sector.

20. The system of claim 19, wherein ones of said plurality of variable size sectors overlap azimuthally, said overlap being a function of ones of said beam signal components being simultaneously provided to a plurality of inputs of said communication device associated with different sectors of said plurality of sectors.

21. The system of claim 20, wherein each of said variable size sectors substantially completely overlaps others of said plurality of variable size sectors, said overlapping variable size sectors substantially providing an omni-trunk communication configuration.

22. The system of claim 11, further comprising:
  management means for substantially automatically managing said plurality of signal path control means to provide dynamic size adjustment of ones said plurality of variable size sectors.

23. The system of claim 22, wherein said management means operates to substantially automatically manage said plurality of signal path control means as a function of communication information determined by said system.

24. The system of claim 22, wherein said management means operates to substantially automatically manage said plurality of signal path control means as a function of a signal provided by a centralized controller operating to control a plurality of cooperating communication systems.

25. A method for providing a variable size sector in a radiation pattern including a plurality of predefined beams each providing a discrete beam signal suitable for input into a transceiver having a plurality of inputs, wherein ones of said plurality of inputs are associated with a particular sector of a plurality of sectors identifiable in said radiation pattern, said method comprising the steps of:
  splitting ones of said plurality of beam signals into substantially identical split beam signals suitable for simultaneous provision to more than one input of said plurality of inputs of said transceiver; and
  selecting said inputs of said transceiver for input of ones of said split beam signals based at least in part on a particular sector said ones of said split beam signals are to be associated with.

26. The method of claim 25, further comprising the step of:
  switching a switch matrix associated with a particular beam signal of said plurality of beam signals to switchably communicate at least one split beam signal of said particular beam signal to a select input of said transceiver.

27. The method of claim 25, further comprising the step of:
  switching a switch matrix associated with a particular input of said plurality of inputs of said transceiver to switchably communicate at least one split beam signal of said particular beam signal to said particular input of said transceiver.

28. The method of claim 27, further comprising the step of:

detecting a beam having the strongest receive signal strength associated with a preselected channel, wherein said switching step is operable to switchably communicate said detected strongest beam signal to said particular input of said transceiver.

29. The method of claim 25, further comprising the step of:

adjusting a set of attenuators associated with a particular beam signal of said plurality of beam signals to allow communication of at least one split beam signal of said particular beam signal to a select input of said transceiver.

30. The method of claim 29, wherein a size of said variable size sector is determined by attenuation of said split beam signal provided to said inputs of said transceiver associated with a particular sector.

31. The method of claim 25, wherein a size of said variable size sector is determined by a number of said split beam signals of different beam signals provided to said inputs of said transceiver associated with a particular sector.

32. The method of claim 31, wherein said variable size sector azimuthally overlaps another sector of said plurality of sectors, said overlap being a function of ones of said split beam signals of a same beam signal being simultaneously provided to a plurality of inputs of said transceiver associated with different sectors of said plurality of sectors.

33. The method of claim 25, further comprising the step of:

managing said provision of ones of said plurality of split beam signals to select inputs of said transceiver to dynamically adjust a size of said variable size sector.

34. The method of claim 33, wherein said managing step operates to substantially automatically adjust a size of said variable size sector as a function of information determined by said system.

35. The method of claim 33, wherein said managing step operates to substantially automatically adjust a size of said variable size sector as a function of a signal provided by a centralized controller operating to control a plurality of cooperating communication systems.

36. An apparatus for dynamically adjusting sector size of a plurality of sectors of a radiation pattern composed of a plurality of predefined narrow beams each providing a discrete signal suitable for input into a communication device having a plurality of inputs, wherein ones of said plurality of inputs are associated with a particular sector of said plurality of sectors of said radiation pattern, said apparatus comprising:

a signal splitter associated with each said discrete signal operable to split said discrete signals into multiple signals each suitable for simultaneous provision to more than one input of said plurality of inputs of said communication device;

a switch matrix associated with each said discrete signal operable to switchably connect ones of said multiple signals to any combination of said plurality of inputs of said communication device; and a set of signal attenuators operable to attenuate ones of said multiple signals associated with a particular discrete signal, wherein attenuation of said ones of said multiple signals is controlled to artificially force a handing off of a communication signal present in an associated one of said discrete signals.

37. The apparatus of claim 36, wherein a width of ones of said sectors is determined at least in part by a number of said multiple signals associated with different discrete signals switched to a particular said input of said communication device.

38. The apparatus of claim 37, wherein said width of said ones of said sectors is adjustable to provide sector overlap, said sector overlap resulting from ones of said multiple signals being simultaneously switched to a plurality of inputs of said communication device associated with different sectors of said plurality of sectors.

39. The apparatus of claim 36, further comprising:

a processor-based controller providing a control signal to said switch matrixes, said control signal operable to cause said switch matrixes to substantially automatically adjust a size of ones said plurality of sectors by switchably connecting select ones of said multiple signals to select ones of said plurality of inputs of said communication device.

40. The apparatus of claim 39, wherein said processor-based controller provides said control signal as a function of current communication information determined by said apparatus.

41. The apparatus of claim 39, wherein said processor-based controller provides said control signal as a function of a signal provided said processor-based controller by a centralized controller operating to control a plurality of communication devices.

42. An apparatus for dynamically adjusting sector size of a plurality of sectors of a radiation pattern composed of a plurality of predefined narrow beams each providing a discrete signal suitable for input into a communication device having a plurality of inputs, wherein ones of said plurality of inputs are associated with a particular sector of said plurality of sectors of said radiation pattern, said apparatus comprising:

a signal splitter associated with each said discrete signal operable to split said discrete signals into multiple signals each suitable for simultaneous provision to more than one input of said plurality of inputs of said communication device;

a set of signal amplifier/attenuators associated with each said discrete signal operable to amplify/attenuate ones of said multiple signals associated with said discrete signal, wherein low order attenuation of said multiple signals provides communication of said multiple signal to a particular input of said plurality of inputs and high order attenuation of said multiple signals substantially interrupts communication of said multiple signal to said particular input; and a signal combiner associated with each input of said plurality of inputs of said communication device operable to combine ones of said multiple signals provided to a same input of said plurality of inputs into a composite signal for input into said communication device, wherein a width of each sector of said plurality of sectors is at least in part defined as a function of said multiple signals provided said inputs associated with each said sector.

43. The apparatus of claim 42, wherein said width of said ones of said sectors is adjustable to provide sector overlap, said sector overlap being a function of ones of said multiple signals being simultaneously provided to a plurality of inputs of said communication device associated with different sectors of said plurality of sectors.

44. The apparatus of claim 42, wherein attenuation of said ones of said multiple signals adjusts an effective length of at least a portion of a sector of said plurality of sectors.

45. The apparatus of claim 42, further comprising:

a processor-based system controlling said attenuator sets to cause said attenuator sets to substantially automatically adjust ones said plurality of sectors to a predetermined size.

46. The apparatus of claim 45, wherein said processor-based system controls said attenuator sets as a function of communication information determined by said apparatus.

47. The apparatus of claim 45, wherein said processor-based system controls said attenuator sets as a function of information from a plurality of communication devices.

48. The apparatus of claim 39, wherein said artificially forced handing off of said communication signal is under control of said processor-based system to increase signal quality of another communication signal although said communication signal forced to hand off is experiencing satisfactory signal quality.

* * * * *